(12) United States Patent
Fölmli et al.

(10) Patent No.: US 9,509,187 B2
(45) Date of Patent: Nov. 29, 2016

(54) HOLLOW-CYLINDRICAL CORELESS WINDING

(71) Applicant: MAXON MOTOR AG, Sachseln (CH)

(72) Inventors: Franz-Xaver Fölmli, Oberdorf (CH); Jens Schulze, Giswil (CH); Raniero Pittini, Hergiswil (CH)

(73) Assignee: MAXON MOTOR AG, Sachseln (CH)

( * ) Notice: Subject to any disclaimer, the term of this patent is extended or adjusted under 35 U.S.C. 154(b) by 705 days.

(21) Appl. No.: 13/779,219

(22) Filed: Feb. 27, 2013

(65) Prior Publication Data

US 2013/0249344 A1 Sep. 26, 2013

(30) Foreign Application Priority Data

Mar. 21, 2012 (EP) .................................. 12001971

(51) Int. Cl.
  *H02K 3/47* (2006.01)
  *H02K 3/00* (2006.01)
  *H02K 3/04* (2006.01)

(52) U.S. Cl.
  CPC *H02K 3/00* (2013.01); *H02K 3/04* (2013.01); *H02K 3/47* (2013.01)

(58) Field of Classification Search
  CPC ......... H02K 3/04; H02K 3/47; H02K 15/061
  USPC ........................................ 310/216.061, 208
  See application file for complete search history.

(56) References Cited

U.S. PATENT DOCUMENTS

| | | | | |
|---|---|---|---|---|
| 4,130,769 A | * | 12/1978 | Karube | ............................ 310/46 |
| 4,398,167 A | * | 8/1983 | Dickie | ................... H02K 33/18 |
| | | | | 310/266 |
| 4,703,211 A | * | 10/1987 | Yazaki | ..................... H02K 3/47 |
| | | | | 310/156.08 |
| 4,937,485 A | * | 6/1990 | Mihalko | ....................... 310/208 |
| 5,294,855 A | | 3/1994 | Mihalko | |

(Continued)

FOREIGN PATENT DOCUMENTS

DE        25 11 567 A1    9/1976
DE   10 2005 051 059 A1    4/2007

(Continued)

OTHER PUBLICATIONS

Mikkelsen et al., Machine Translation of EP1499000, Jan. 2005.*

(Continued)

*Primary Examiner* — Quyen Leung
*Assistant Examiner* — Eric Johnson
(74) *Attorney, Agent, or Firm* — Buchanan Ingersoll & Rooney PC

(57) ABSTRACT

Exemplary embodiments relate to a hollow-cylindrical coreless winding for an electric motor. The winding includes a plurality of single coils which are distributed across the circumference of the winding, wherein each single coil includes a plurality of turns which are spirally wound around a winding axis which is perpendicular to an axis of the winding. Successive single coils overlap in a roof tile manner. The winding includes at least two phase windings, each of the phase windings consisting of several ones of the single coils. The phase windings are offset with respect to each other in the circumferential direction of the hollow-cylindrical winding, so that the single coils of a first phase winding are disposed in the circumferential direction of the hollow-cylindrical winding between the single coils of a second phase winding. Each of the phase windings is wound from a continuous wire.

15 Claims, 4 Drawing Sheets

(56) References Cited

U.S. PATENT DOCUMENTS

Figure 1:
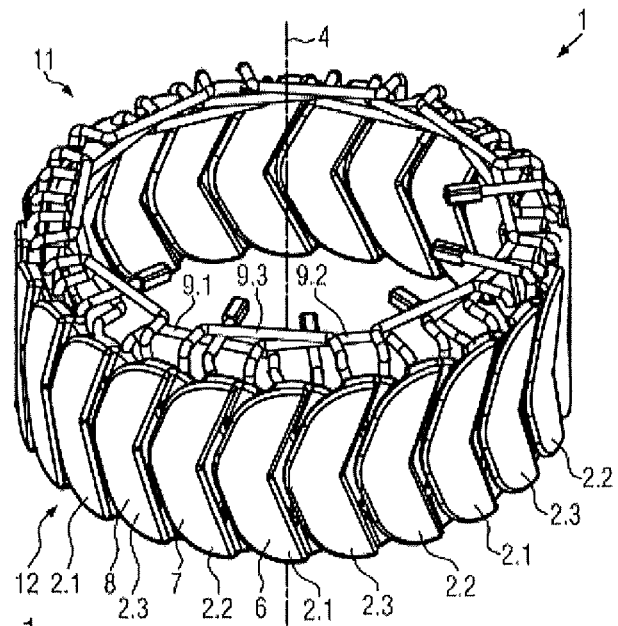

| | | | |
|---|---|---|---|
| 7,061,153 B1* | 6/2006 | Foshage et al. | 310/180 |
| 7,671,504 B2 | 3/2010 | Rohrer et al. | |
| 2005/0225197 A1* | 10/2005 | Nagano et al. | 310/254 |
| 2009/0243424 A1* | 10/2009 | Watanabe et al. | 310/216.109 |
| 2010/0295385 A1 | 11/2010 | Hsu et al. | |

FOREIGN PATENT DOCUMENTS

| | | | | |
|---|---|---|---|---|
| EP | 0 150 070 A2 | 7/1985 | | |
| EP | 1 073 179 A2 | 1/2001 | | |
| EP | 1499000 A1 * | 1/2005 | | H02K 1/14 |
| EP | 2 026 450 A2 | 2/2009 | | |
| GB | 1500955 A * | 2/1978 | | |
| JP | 2004289963 A * | 10/2004 | | H02K 3/47 |

OTHER PUBLICATIONS

European Search Report issued on Aug. 3, 2012.

* cited by examiner

HOLLOW-CYLINDRICAL CORELESS WINDING

The present invention relates to a hollow-cylindrical coreless winding for an electric motor.

From prior art, hollow-cylindrical coreless windings for electric motors are known which consist of a plurality of single coils which are distributed across the circumference of the hollow-cylindrical winding and overlap each other in a roof tile manner. Each single coil is wound from wire and comprises several turns. It is characteristic of hollow-cylindrical coreless windings that the coils of the winding are not wound upon a slotted iron support but are designed to be self-supporting. The coils are often wound from stoved-enamel wire. By this, the individual turns of the single coils can be baked to each other after having been wound up, thus adding stability to the coils and thereby to the complete winding.

Such hollow-cylindrical coreless windings are employed both in the rotor of small, mechanically commutated electric motors and in the stator of electronically commutated electric motors. Mechanically commutated d. c. motors with a coreless hollow-cylindrical winding are also known as bell-type armature motors or electric motors with a coreless armature. Electronically commutated motors with a hollow-cylindrical coreless stator winding are also referred to as non-slotted motors or EC motors.

Advantages of such electric motors include their high efficiency, freedom from detent torques and linear control properties.

From U.S. Pat. No. 5,294,855, a method for the manufacture of a hollow-cylindrical coreless winding is known whose single coils are distributed across the circumference of the winding and overlap each other in a roof tile manner. The method is only suited for the manufacture of a winding in which the turns of the single coils are offset with respect to each other in parallel.

From DE 10 2005 051059 A1, a hollow-cylindrical coreless winding of the type mentioned in the beginning is known. In this winding, the turns of each single coil are wound spirally around a winding axis which is perpendicular to the axis of the hollow-cylindrical winding. Compared to the winding known from U.S. Pat. No. 5,294,855 with turns that are offset with respect to each other in parallel, this design in particular offers the advantage of the winding space being optimally utilized. Therefore, optimized power density is achieved by the spiral winding. The single coils of the hollow-cylindrical winding known from DE 10 2005 051059 A1 are each wound from a separate wire. The wire ends of each single coil are lead out of the winding and must be contacted separately. The single coils are described to be manufactured separately due to their desired precision and shaping. To facilitate contacting, the wire ends of adjacent single coils can be twisted with each other.

It is the object of the present invention to improve the hollow-cylindrical coreless winding of the type mentioned in the beginning such that further facilitated contacting is possible and the failure risk of the single coils is preferably low. It is furthermore the object of the present invention to provide a hollow-cylindrical coreless winding of the type mentioned in the beginning which permits a preferably simple and quick manufacture of multi-pin electric motors.

Accordingly, the solution according to the invention consists in the winding comprising at least two phase windings, each of the phase windings consisting of several ones of the single coils, the phase windings furthermore being offset with respect to each other in the circumferential direction of the hollow-cylindrical winding, so that the single coils of a first phase winding is disposed in the circumferential direction of the hollow-cylindrical winding between the single coils of a second phase winding, each of the phase windings being wound from a continuous wire.

The invention offers the advantage that not each coil of the winding must be contacted individually. The contacting of the winding is thus easier and less expensive. Compared to windings with single coils of which the wire ends are twisted with each other, in the solution according to the invention, the failure risk of the single coils is far lower. This is because each twisting involves the risk of the twisted wire ends getting detached from each other or of an increased transition resistance between the wire ends over time, for example, due to corrosion. The hollow-cylindrical coreless winding according to the invention is therefore particularly suited for the manufacture of multi-pin electric motors which comprise a plurality of single coils, as is well-known.

The winding terminations of the phase windings can be wired up in a star or in a delta arrangement. For wiring, a printed circuit board can be provided. In the winding according to the invention, the number of winding terminations to be contacted is low, compared to the number of contained single coils, which is why the printed circuit board can be kept very small compared to conventional designs. By the low number of winding terminations, one can also completely dispense with a printed circuit board. With the winding according to the invention, therefore both the complexity of manufacture and the costs of the electric motors equipped with the winding are reduced. If no printed circuit board is provided, the winding terminations can be connected directly with each other and/or directly with the motor connections. Preferably, the connections are established by soldering.

In a particularly preferred embodiment of the present invention, connecting sections of the continuous wire extend between successive single coils of a phase winding radially offset to the single coils with respect to the axis of the hollow-cylindrical winding. This permits to insert the individual phase windings of the hollow-cylindrical winding one into the other. The phase windings can thus be very precisely made individually and can be subsequently joined into a winding group. Particularly preferred, these connecting sections extend between successive single coils of a phase winding radially within the hollow-cylindrical winding formed by the single coils. Thus, a very compact winding is achieved.

Also particularly preferred, the wire extends between two successive single coils of the phase winding and starting from these two single coils at an axial end of the hollow-cylindrical winding initially each towards the axis of the hollow-cylindrical winding, while it then extends between the two coils radially spaced apart from the inner side of the winding. This abets the insertion of the coils of a first phase winding between the coils of a second phase winding. Thus, the single coils can easily evade or be twisted in themselves when the phase windings are inserted into each other. It is not absolutely necessary for the wire to directly extend towards the axis of the winding, starting from the single coils. Preferably, however, the wire extends in this section which runs towards the axis at least in parallel to the winding axis of the respective single coil.

Further particularly preferred, the connecting sections of the second phase winding are offset with respect to the connecting sections of the first phase winding in the direction of the axis of the hollow-cylindrical winding. Thus, the coils of the different phase windings can be completely inserted into each other. For example, the connecting sections between the coils of a first phase winding can directly extend at the axial end of the hollow-cylindrical winding, whereas the wire in the second phase winding is initially axially just a little bit led out of the hollow-cylindrical winding at each coil. In each additionally provided phase winding, the wire must be axially led out at the ends of the connecting sections for some further length.

It can furthermore be provided for the connecting sections between successive single coils of the first phase winding and the connecting sections between successive single coils of the second phase winding to be disposed at different axial ends of the hollow-cylindrical winding. In this embodiment, too, the coils of two different phase windings can be particularly easily inserted into each other. This embodiment is particularly suited if only two different phase windings are provided.

In a further particularly preferred embodiment of the present invention, the winding comprises three phase windings. This embodiment is particularly suited in electronically commutated electric motors with more than two rotor poles. For example, the rotor can comprise between 4 and 32 rotor poles.

In another embodiment of the present invention, the single coils comprise a first section and a second section, wherein between the first section and the second section, a radial offset is provided with respect to the axis of the hollow-cylindrical winding, and wherein the overlap in a roof tile manner is achieved by the second section of a coil coming to lie on the first section of an adjacent single coil. Thereby, an extremely compact design is achieved. The two sections are preferably each lying in a cylindrical surface around the axis of the hollow-cylindrical winding. The cylindrical surface of the second section has a greater radius, that means it extends at a greater distance from the axis of the hollow-cylindrical winding than the cylindrical surface of the first section. The windings of the single coil extend in parallel to each other each for one half in the first cylindrical surface and for the other half in the second cylindrical surface. At the offset, there is a jump to the higher or lower cylindrical surface, respectively.

Preferably, the turns of one single coil have a bulging in the region of the offset. The bulging ensures that a sufficient length of wire for the formation of the offset is available. The offset can therefore be generated after the winding operation without there being a risk of the wire being damaged or even torn in the region of the offset. The bulging in the region of the offset can preferably be a hairpin-like or a loop-like bulging.

In another preferred embodiment of the present invention, the projection of the basic shape of the turns of one single coil is hexagonal or rhombic in a plane perpendicular to the winding axis. By this, an optimal utilization of the available winding space is achieved. Other basic shapes, in particular the basic shapes known from DE 10 2005 051059 A1, are also possible.

In another preferred embodiment of the present invention, the phase windings are wound from a stranded wire. A stranded wire has the advantage that the wire is extremely flexible and can be non-destructively wound even in very small radii. Moreover, the prefabricated phase windings can thereby be inserted into each other without being destructed. The flexibility achieved due to the stranded wire also permits slight deformations of the phase windings which possibly become necessary when the phase windings are inserted into each other. However, other wires can also be used for the manufacture of the phase winding. Particularly preferred, wires of a rectangular wire cross-section are employed. Thereby, a better utilization of space is achieved. If the wire is designed as stoved-enamel wire, the winding can moreover be baked after its manufacture, thus increasing the stability of the winding.

In another embodiment of the present invention, successive coils of a phase winding are wound in opposite directions. Thereby, with certain winding constellations, an advantageous superimposition of the magnetic fields generated by the winding can be achieved.

The invention furthermore provides an electric motor with a rotor and a stator, the electric motor being designed as an electronically commutated electric motor and the stator comprising a hollow-cylindrical winding according to the invention. The hollow-cylindrical winding according to the invention is particularly suited for electronically commutated electric motors.

Figure 2:
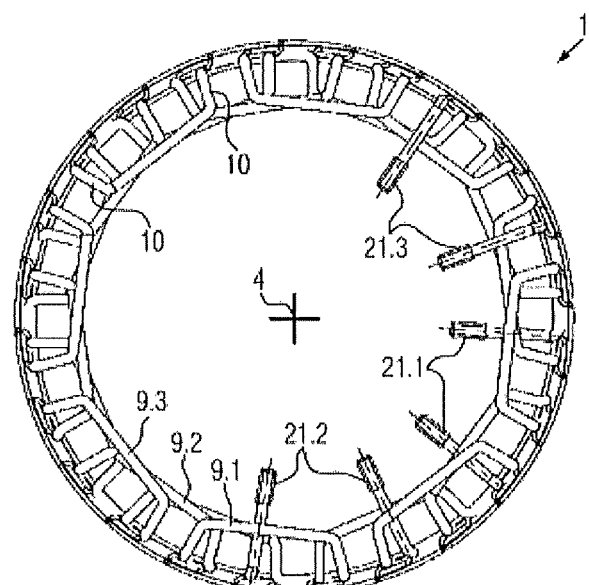
Figure 3:
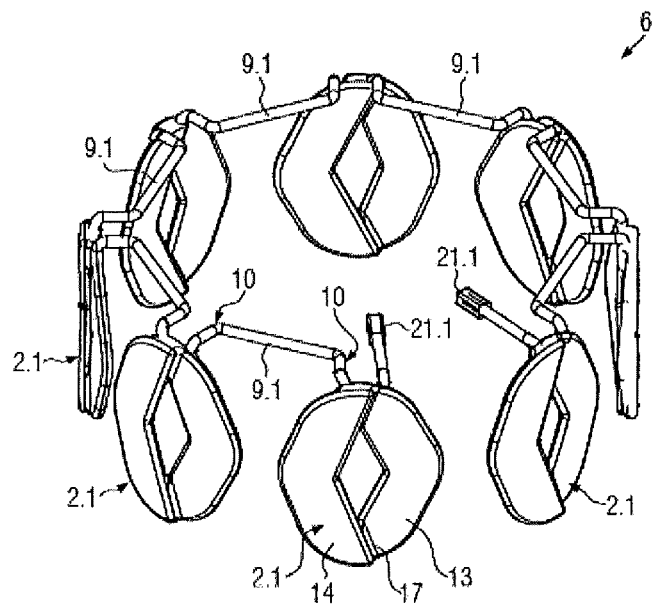
Figure 4:
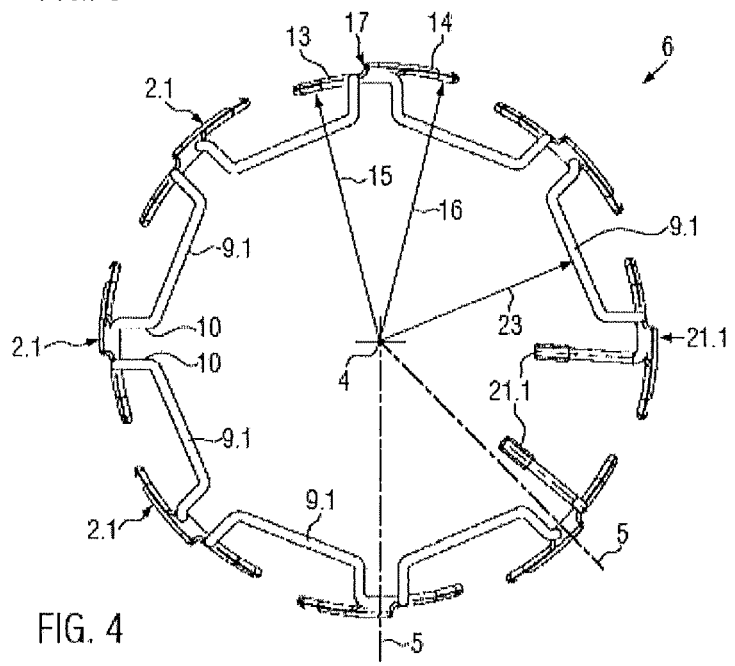
Figure 5:
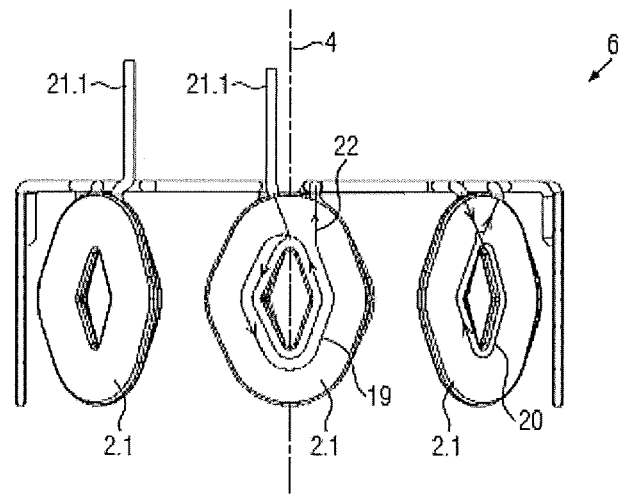
Figure 6:
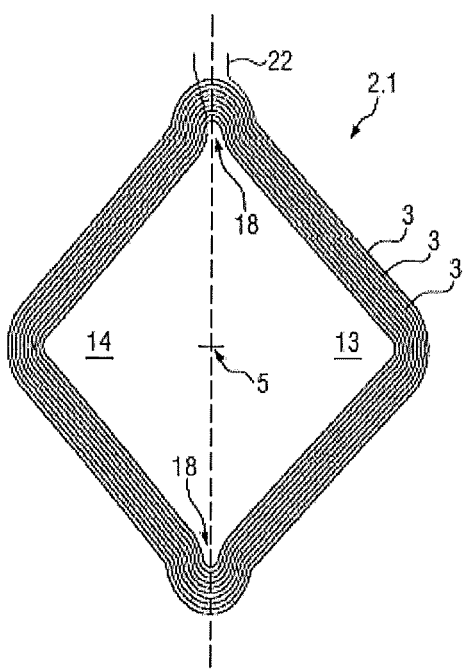
Figure 7:
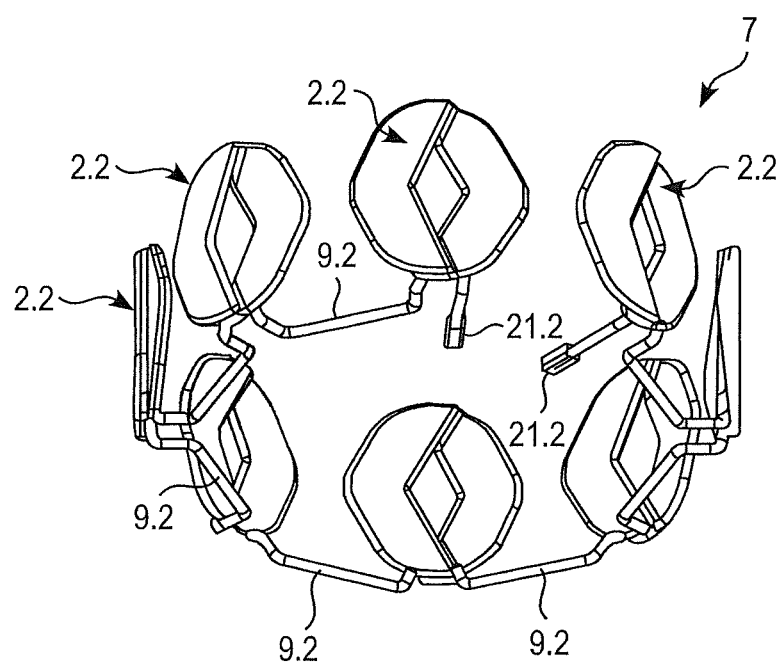

One embodiment of the present invention will be illustrated more in detail below with reference to drawings. In the drawings:

FIG. 1 shows a hollow-cylindrical coreless winding according to the invention in a diagonal view, FIG. 2 shows the winding according to the invention of FIG. 1 in a plan view, FIG. 3 shows a phase winding of the hollow-cylindrical winding according to the invention of FIGS. 1 and 2 in a diagonal view, FIG. 4 shows the phase winding of FIG. 3 in a plan view, FIG. 5 shows the phase winding of FIGS. 3 and 4 before their final completion in a side view, FIG. 6 shows a schematic representation of a single coil of the phase winding shown in FIG. 5, and FIG. 7 shows the connecting sections between successive single coils of the first phase winding and connecting sections between successive single coils of the second phase winding are arranged at different axial ends of the hollow-cylindrical winding.

In the following illustrations, equal parts are designated by equal reference numerals. If a drawing contains reference numerals which are not explicitly mentioned in the corresponding description of the figure, reference is made to the previous or following description of figures.

FIGS. 1 and 2 show different views of a hollow-cylindrical coreless winding 1 according to the invention. In FIG. 1, the axis 4 and the upper axial end 11 and the lower axial end 12 of the winding 1 according to the invention can be seen. The winding 1 according to the invention is essentially composed of a plurality of single coils 2.1, 2.2, and 2.3. The single coils are distributed across the circumference of the winding 1 where successive single coils overlap each overlap each other in a like roof tile manner.

As can be seen in particular in FIGS. 5 and 6, the single coils of the winding 1 according to the invention are spirally wound around the winding axis 5 shown in FIG. 6 from a stranded wire 22. The winding axis 5 of each one of the single coils is perpendicular to the axis 4 of the hollow-cylindrical winding 1 according to the invention.

The single coils of the hollow-cylindrical winding according to the invention are combined into three so-called phase windings 6, 7 and 8. The first phase winding 6 is represented in FIG. 3. As shows FIG. 3, each of the three phase windings 6, 7 and 8 is wound from a continuous stranded wire. The single coils 2.1 of the first phase winding 6 shown in FIG. 3 are each connected to each other via a connecting section 9.1 of the continuous stranded wire. The ends of the stranded wire form the two winding terminations 21.1 of the phase winding 6. The two other phase windings 7 and 8 shown in FIG. 1 are essentially designed as the phase winding 6. However, the three phase windings 6, 7 and 8 are offset with respect to each other in the circumferential direction of the hollow-cylindrical winding 1, so that the single coils of the three phase windings each follow each other alternately. In FIG. 1, one can clearly see that a single coil 2.1 of the first phase winding 6 is followed by a single coil 2.2 of the second phase winding 7, which is in turn followed by a single coil 2.3 of the third phase winding 8. This pattern is repeated eight times across the circumference of the hollow-cylindrical winding 1 as each of the three phase windings 6, 7 and 8 comprises eight single coils.

As shows FIG. 2, the terminations of the three phase windings are also each arranged at different positions in the circumferential direction of the hollow-cylindrical winding 1. The terminations of the second phase winding 7 are designated in FIG. 2 with reference numeral 21.2, the terminations of the third phase winding 8 with reference numeral 21.3.

In order to be able to insert the three phase windings 6, 7 and 8, as shown in FIG. 1, into each other, the connecting sections of the stranded wire between the single coils of the phase windings must be suitably designed. As shows FIG. 1, all connecting sections 9.1, 9.2 and 9.3 of the three phase windings are arranged at the upper axial end 11 of the hollow-cylindrical winding 1. All connecting sections, however, are offset to the inside in the radial direction with respect to the inner diameter of the hollow-cylindrical winding 1. One can clearly see this, for example, in FIG. 4 which shows a plan view onto the first phase winding 6. The radius of the inner wall of the hollow-cylindrical winding is in this representation designated with reference numeral 15. The connecting sections 9.1 of the first phase winding 6 extend at a distance from this wall and are thus somewhat offset to the axis 4 of the hollow-cylindrical winding. To achieve this offset, the stranded wire extends, both at the beginning and at the end of each of the single coils 2.1, starting from the upper axial end 11 initially for some length towards the axis 4 of the hollow-cylindrical winding. This length which allows the radial offset of the connecting sections 9.1 of the stranded wire is designated with reference numeral 10 in FIGS. 3 and 4.

It is pointed out that the piece 10 of the stranded wire does not necessarily have to extend towards the axis 4. Advantageously, however, the stranded wire extends in this section at least in parallel to the winding axis 5 of the respective single coil 2.1. It is thus ensured that sufficient space is provided for inserting the two other phase windings 7 and 8 into the first phase winding 6. As shows FIG. 4, the connecting sections 9.1 of the first phase winding 6 extend tangentially to an imaginary inner cylinder with the radius 23 which is smaller than the inner radius 15 of the hollow-cylindrical winding. Instead of the tangential course of the connecting sections 9.1, it is also conceivable for the connecting sections 9.1 to extend along an orbit with the radius 23.

In FIGS. 1 and 2, one can see that the connecting sections 9.2 of the second phase winding 7 extend in the axial direction of the hollow-cylindrical winding 1 over the connecting sections 9.1 of the first phase winding 6. The connecting sections 9.3 of the third phase winding 8 finally also extend above the connecting sections 9.2 of the second phase winding 7. Therefore, with the two phase windings 7 and 8, the stranded wire is led out towards the top in the axial direction each at the beginning and end of the single coils to different degrees before it extends towards the axis 4 of the hollow-cylindrical winding. Otherwise, the arrangement of the connecting sections 9.2 and 9.3 of the second and third phase windings corresponds to the arrangement of the connecting sections 9.1 of the first phase winding 6.

FIG. 6 shows a schematic view of the winding course of a single coil of the inventive hollow-cylindrical winding. The stranded wire 22 is spirally wound in several turns 3 around the winding axis 5 of the single coil 2.1, the basic shape of the windings being rhombic. As FIG. 6 shows, the turns 3 extend one next to the other in parallel. FIGS. 3 and 4 show that each coil comprises a first section 13 and a second section 14, a radial offset being present between these two sections with reference to the axis 4 of the hollow cylinder winding. The turns 3 of the single coils here only extend one half each in the first section 13 and the other half in the second section 14. The first section 13 is located in a cylindrical surface with the smaller radius 15 shown in FIG. 4 around the axis 4 of the hollow-cylindrical winding, whereas the second section 14 is lying in a cylindrical surface with a somewhat greater radius 16 around the axis 4 of the hollow cylinder winding. This embodiment of the single coils permits the overlap in a roof tile manner represented in FIG. 1. The second section 14 of a single coil 2.1 of the first phase winding 6 is thus lying on the first section 13 of a coil 2.2 of the second phase winding 7. The same constellation results between the coils 2.2 of the second phase winding 7 and the coils 2.3 of the third phase winding 8.

FIG. 5 shows the first phase winding 6 as a semi-finished product. The single coils 2.1 have been wound in one plane, so that the windings of the single coils each extend in a flat plane. Therefore, neither have the single coils 2.1 the offset 17 shown in FIGS. 3 and 4, nor are the right and left sections bent, so that the windings are lying in one cylindrical surface. FIG. 5 moreover shows an embodiment with opposite winding directions of two successive single coils 2.1. The single coil shown in the centre of the picture is wound counter-clockwise in the winding direction 19, the single coil shown next to it to the right is wound in the opposite, clockwise direction 20. The winding in the opposite direction can be advantageous in special winding arrangements. The single coils, however, can also be all wound in the same winding direction. In order to permit to produce the offset 17 shown in FIGS. 3 and 4 without damaging the stranded wire in the process, the windings 3 of the single coil have, in the region of the offset, the hairpin bulging 18 shown in FIG. 6. The bulging 18 ensures that in the region of the offset to be created, a sufficient length of wire is provided.

The invention claimed is:

1. A hollow-cylindrical coreless winding for an electric motor, comprising:
   a plurality of single coils which are arranged to be distributed across a circumference of the winding,
   wherein each single coil includes a plurality of turns which are spirally wound around a winding axis that is perpendicular to an axis of the winding, and
   wherein successive single coils overlap in a roof tile manner, wherein the winding includes at least two phase windings, wherein each of the phase windings includes several of the single coils, wherein the phase windings are furthermore offset with respect to each other in a circumferential direction of the hollow-cylindrical winding, so that the single coils of a first phase winding are arranged, in the circumferential direction of the hollow-cylindrical winding, between the single coils of a second phase winding, and wherein each of the phase windings is wound from a continuous wire; and wherein connecting sections of the continuous wire extend between successive single coils of the phase windings with respect to the axis of the hollow-cylindrical winding radially offset to the single coils, such that said connecting sections are radially offset to an inner diameter of said hollow-cylindrical winding allowing said phase windings to be inserted into each other along a direction of said axis of said hollow-cylindrical winding, wherein the connecting sections of all or all but one of said phase windings are axially offset to an axial end of said hollow-cylindrical winding in a direction away from said axial end and wherein the connecting sections of each of said phase windings have a different axial position with respect to said axis of said hollow-cylindrical winding than the connecting sections of the other of said phase windings.

2. The winding according to claim 1, wherein the wire extends between two successive single coils of the phase winding starting from both single coils at said axial end of the hollow-cylindrical winding initially each towards the axis of the hollow-cylindrical winding and subsequently radially at a distance from an inner side of the hollow-cylindrical winding.

3. The winding according to claim 1, wherein the connecting sections between successive single coils of the first phase winding and the connecting sections between successive single coils of the second phase winding are arranged at different axial ends of the hollow-cylindrical winding.

4. The winding according to claim 1, wherein the winding includes three phase windings.

5. The winding according to claim 1, wherein the single coils include a first section and a second section, wherein between the first section and the second section, a radial offset is provided with respect to the axis of the hollow-cylindrical winding, and wherein the overlap in a roof tile manner is achieved by the second section of a single coil coming to lie on the first section of an adjacent single coil of the hollow-cylindrical winding.

6. The winding according to claim 5, wherein the turns of a single coil have a bulging in a region of the offset.

7. The winding according to claim 1, wherein a projection of the basic shape of the turns of a single coil is hexagonal or rhombic in a plane perpendicular to the winding axis.

8. The winding according to claim 1, wherein the phase windings are wound from a stranded wire.

9. The winding according to claim 1, wherein successive single coils of a phase winding are wound in opposite directions.

10. An electric motor with a rotor and a stator, wherein the electric motor is an electronically commutated electric motor and the stator comprises a hollow-cylindrical winding according to claim 1.

11. The winding according to claim 2, wherein the connecting sections between successive single coils of the first phase winding and the connecting sections between successive single coils of the second phase winding are arranged at different axial ends of the hollow-cylindrical winding.

12. The winding according to claim 1, wherein the connecting sections between successive single coils of the first phase winding and the connecting sections between successive single coils of the second phase winding are arranged at different axial ends of the hollow-cylindrical winding.

13. The winding according to claim 2, wherein the winding includes three phase windings.

14. The winding according to claim 1, wherein the winding includes three phase windings.

15. The winding according to claim 3, wherein the winding includes three phase windings.

* * * * *